R. W. EASTMAN.
REMOVABLE AUTOMOBILE TOP.
APPLICATION FILED AUG. 15, 1911.
1,032,997.
Patented July 16, 1912.
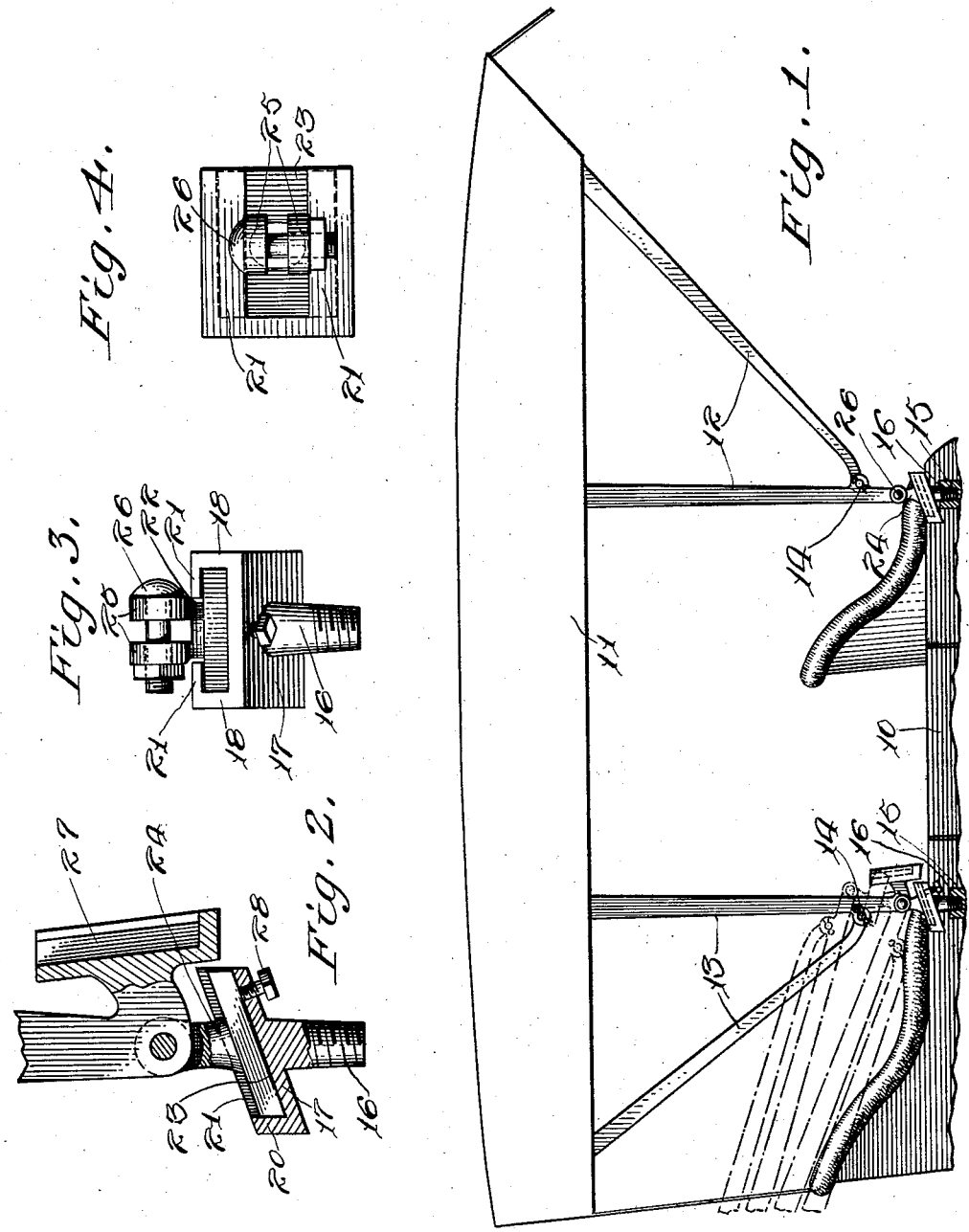
WITNESSES
Howard F. Costello
L. N. Gillis
INVENTOR
Raymond W. Eastman
By E. E. Vroomen
his Attorney

UNITED STATES PATENT OFFICE.

RAYMOND W. EASTMAN, OF ALVA, OKLAHOMA.

REMOVABLE AUTOMOBILE-TOP.

1,032,997. Specification of Letters Patent. Patented July 16, 1912.

Application filed August 15, 1911. Serial No. 644,148.

*To all whom it may concern:*

Be it known that I, RAYMOND W. EAST-MAN, a citizen of the United States, residing at Alva, in the county of Woods and State of Oklahoma, have invented certain new and useful Improvements in Removable Automobile-Tops, of which the following is a specification, reference being had therein to the accompanying drawing.

This invention relates to removable tops, for vehicles such as automobiles.

The principal object of the invention is to improve and simplify the means whereby the bows of vehicles may be connected with the body of the vehicle.

With the above and other objects in view as will be hereinafter apparent, the invention consists in general of certain novel arrangement or details and combination the parts hereinafter fully described, illustrated in the accompanying drawings and specifically claimed.

In the accompanying drawings, like characters of reference indicate like parts in the several views, and Figure 1, is a partial side elevation of a vehicle with the improved device applied thereto. Fig. 2, is a view in section showing the rear attachment used with this device. Fig. 3, is a front view of the rear attachment. Fig. 4, is a plan view of the front attachment.

In order to illustrate the device, the same has been shown as applied to a vehicle having a body 10. On this vehicle is the usual body 11 supported by the front bows 12 and the rear bows 13, the different members of which are pivoted as at 14. Secured in suitable sockets 15 adjacent the front and rear of the body 10 are socket members each of which comprises a stem 16 threaded for engagement with its socket and having on top a plate 17 provided with side flanges 18 and a rear flange 20. The side flanges 18 each having inwardly projecting ribs 21 so arranged that a slot 22 is formed between the inner edges of these ribs.

The male member of the coupling comprises a plate 23 from which rises a stem 24 having at its upper end a pair of perforated ears 25 for the reception of a pivot bolt 24 by means of which it is pivoted to its respective bow.

It is to be observed that the above plates 17 and 23 are displayed at such an angle to the respective stems 16 and 24 that when in position the socket plate 23 will slant rearwardly and downwardly to the car body. This inclination of the sockets is important as the members engaging the sockets are held by gravity and, of course are less likely to fall out of place than as if they were disposed horizontally.

Upon the rear bows 13 is secured or formed a socket 27 similar in all respects to the socket bows heretofore described, and displaced at such an angle that the forward male member may be swung about its pivot to enter the slot in said member 27.

In order to prevent the rear member 23 from being accidentally displaced, a set-screw 28 is provided which extends through a threaded opening in the plate 17 and engages the under side of the member 23.

In using this device when it is wished to fold back the top 11 the forward male member at each side of the bows 12 is removed from its socket and placed in the respective socket 27. The entire top may then be swung down as shown in dotted lines in Fig. 1. If it is wished to entirely remove the top from the vehicle body the set screws 28 are loosened forward whereupon the entire body may be picked up in folded position and removed from the vehicle body.

There has thus been provided a simple and efficient device of the kind described and for the purpose specified.

It is obvious that minor changes may be made in the form and construction of this invention without departing from the material principles thereof. It is not therefore desired to confine the invention to the exact form herein shown and described but it is wished to include all such as properly come within the scope of the appended claim.

Having thus described the invention, what is claimed as new is:—

The combination with a vehicle of a top therefor provided with sets of pivotally connected bows, rearwardly and downwardly inclined sockets mounted on said vehicle at each side thereof, and in spaced relation, other sockets carried by the rear bows and arranged in substantial vertical relation when the top is up, and male members carried by the rear bows for engagement with the rear sockets and other male members carried by the front bows and adapted for engagement with the front sockets when the top is in operative position and with the sockets on the rear bows when the top is collapsed and means carried by said sockets and adapted to engage with the male members to retain them in position.

In testimony whereof I hereunto affix my signature in presence of two witnesses.

RAYMOND W. EASTMAN.

Witnesses:
T. W. THORNHILL,
SANDOR J. VIGG.

Copies of this patent may be obtained for five cents each, by addressing the "Commissioner of Patents, Washington, D. C."